(12) United States Patent
Wirick et al.

(10) Patent No.: US 10,482,917 B2
(45) Date of Patent: Nov. 19, 2019

(54) EFFICIENT JUST-IN-TIME TRANSCODING BY PARAMETER EXTRACTION

(71) Applicant: ARRIS Enterprises LLC, Suwanee, GA (US)

(72) Inventors: Kevin S. Wirick, Olivenhain, CA (US); Ajay Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 74 days.

(21) Appl. No.: 15/044,267

(22) Filed: Feb. 16, 2016

(65) Prior Publication Data

US 2017/0236546 A1  Aug. 17, 2017

(51) Int. Cl.
| | |
|---|---|
| *G11B 20/00* | (2006.01) |
| *H04N 21/274* | (2011.01) |
| *H04N 21/2343* | (2011.01) |
| *H04N 19/59* | (2014.01) |
| *H04N 19/12* | (2014.01) |
| *H04N 21/235* | (2011.01) |
| *H04N 19/40* | (2014.01) |

(52) U.S. Cl.
CPC ....... *G11B 20/00007* (2013.01); *H04N 19/12* (2014.11); *H04N 19/40* (2014.11); *H04N 19/59* (2014.11); *H04N 21/2353* (2013.01); *H04N 21/23439* (2013.01); *H04N 21/274* (2013.01); *G11B 2020/00072* (2013.01)

(58) Field of Classification Search
USPC ........................................................ 386/232
See application file for complete search history.

(56) References Cited

U.S. PATENT DOCUMENTS

| | | | |
|---|---|---|---|
| 2003/0070081 A1* | 4/2003 | Wee | H04L 63/04 713/189 |
| 2009/0323813 A1 | 12/2009 | Maciel et al. | |
| 2011/0299601 A1* | 12/2011 | Lai | H04N 21/8451 375/240.25 |
| 2012/0063516 A1* | 3/2012 | Kwon | H04N 19/56 375/240.16 |
| 2013/0208792 A1* | 8/2013 | He | H04N 19/00569 375/240.12 |
| 2014/0269927 A1* | 9/2014 | Naletov | H04N 19/00472 375/240.18 |

(Continued)

OTHER PUBLICATIONS

PCT Search Report & Written Opinion, Re: Application No. PCT/US2017/015024, dated Mar. 29, 2017.

(Continued)

*Primary Examiner* — Hung Q Dang
(74) *Attorney, Agent, or Firm* — Thomas A. Ward

(57) ABSTRACT

A method of video encoding is provided to reduce the cost of network DVR storage by building on a concept of Just-In Time (JIT) transcoding which eliminates storing all formats of content in a DVR. A super-encoding procedure is provided that encodes a high resolution format, such as HEVC, while metadata is provided for lower resolution formats, such as MPEG4. The metadata can include items like motion vectors to reduce the computational costs during JIT transcoding. The super-encoded data is stored in memory of the DVR. High resolution encoded data is read directly out of the DVR memory, while lower resolutions are transcoded from the DVR memory data using the metadata to increase efficiency.

12 Claims, 3 Drawing Sheets

(56) References Cited

U.S. PATENT DOCUMENTS

2016/0255355 A1* 9/2016 Andersson ............. H04N 19/40

OTHER PUBLICATIONS

M. Sugano, et al., "An efficient transcoding from MPEG-2 to MPEG-1", 2001 Proceedings International Conference on Image Processing ICIP 2001, Oct. 7-10, 2001 (International Conference on Image Processing), Institution of Electrical and Electronics Engineers, NY, NY, vol. 1, Oct. 7, 2001, pp. 417-420.
Yi Wang, et al., "Off-Line Motion Description for Fast Video Stream Generation in MPEG-4 AVC/H.264", Prodeedings/2006 IEEE International Conference on Multimedia and Expo, ICME 2006, Jul. 9, 2006, pp. 685-688.
K. Goh, et al., "Real-time software MPEG-2 to H.264 video transcoding",Multimedia and Expo, 2008 IEEE International Conference on, IEEE, Jun. 23, 2008, pp. 165-168, the whole document.
J. Askelof, et al., "Metadata-driven multimedia access", IEEE Signal Processing Magazine, vol. 20, No. 2, Mar. 1, 2003, pp. 40-52.

\* cited by examiner

EFFICIENT JUST-IN-TIME TRANSCODING BY PARAMETER EXTRACTION

BACKGROUND

Technical Field

The present invention relates to managing video storage requirements for a network digital video recorder (DVR). In particular, the present invention relates to limiting the number different resolution video streams going to a network DVR storage as well as reducing transcoding processing needs when alternate resolution formats of video content are needed than those stored in the DVR.

Related Art

A network DVR cost is dominated by video storage. This cost in terms of storage space is especially high when the network DVR stores different resolutions to serve multi-screens. For multiple video screen resolutions, separate storage can be required for each screen size and for each compression technology. It is desirable to provide a network DVR system that uses efficient video processing to reduce storage and lower the overall system costs.

SUMMARY

Embodiments of the present invention reduce the cost of network DVR storage by building on a concept of Just-In Time (JIT) transcoding which eliminates storing all formats of content in a DVR. When a lower resolution video stream which is not stored is needed for a small screens, it is re-created in real-time using a JIT-Transcoder. So instead of storing all versions of a piece of content, with embodiments of the present invention only the highest resolution version is stored which can reduce the storage costs by 50% or more depending on how many resolutions are used.

The proposed solution exploits the relative computational burden of initial incoming encoding which is performed prior to content storage, and outbound encoding which is performed when content is streamed for viewing. Incoming encoding for storage is performed once on each piece of content. Outbound encoding is determined by the number of times a piece of content is viewed, which can be thousands or millions of times. This innovation performs computations on the input that reduce the processing load of the JIT transcoder so that it has a small computational cost and provides a leveraged benefit for the overall system when transcoding. For example to minimize storage in a network DVR, in one embodiment, encoding is done in HEVC since it provides the most efficient compression and therefore minimizes storage costs. However most viewing devices are MPEG4 or MPEG2, so additional computations are made during the initial HEVC compression and the resulting metadata is stored in the network DVR so that the JIT transcoder can recreate these legacy, less efficient stream-types with a reduced computational costs for the multiple times content is streamed out for viewing. This same principle is applied to create lower resolution HEVC video. Additional computations are made during the initial HEVC compression and the resulting metadata is stored in the network DVR so that the JIT transcoder can recreate these lower resolution video streams with reduced computational costs for the multiple times content is streamed out for viewing.

An example of the type of metadata captured during the initial encoding is motion vectors. Encoding HEVC requires many more permutations of block sizes and combinations than legacy compression technologies, and the additional HEVC block sizes can be considered a superset of MPEG4 and MPEG2. The proposed solution for embodiments of the present invention is to have a "super-encoder" that performs more computations than HEVC encoding on the input to enable transcoding of lower resolutions and legacy compression technologies such as MPEG4 and MPEG2, and further a "Fast JIT transcoder" that exploits the metadata provided by the super-encoder when transcoding later. The super-encoder computes an HEVC compressed stream for storage, and also computes metadata that reduces the computational load for subsequent JIT transcoding from HEVC to MPEG4 or MPEG2. The metadata targets the largest computational load of transcoding, typically motion vectors.

Embodiments of the present invention, thus, simplify transcoding from HEVC to lower resolutions and legacy compression formats such as MPEG2 and MPEG4. For example, MPEG4 motion vectors can be characterized as 70% of the overall computational load of MPEG4 encoding. This proposed solution for storing video in a network DVR with super-encoding and metadata to enable simplified transcoding, thus, reduces the motion vector calculations during transcoding significantly and offers cost savings.

BRIEF DESCRIPTION OF THE DRAWINGS

Further details of the present invention are explained with the help of the attached drawings in which.

DETAILED DESCRIPTION

Figure 1:
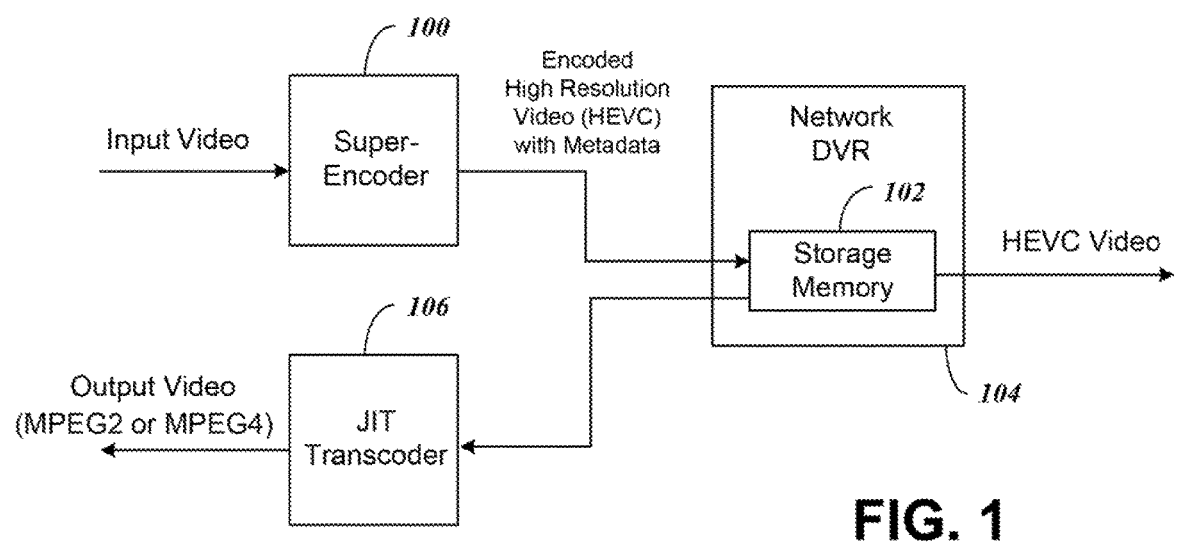
FIG. 1 is a block diagram of components of a system that provides super-encoding according to embodiments of the present invention to create encoded data in a high resolution format with metadata to enable JIT transcoding of lower resolution formats, the encoded data with metadata for storage in a DVR memory, and the JIT transcoder generating the lower resolution video.

FIG. 1 is a block diagram of components of a system that provides super-encoding according to embodiments of the present invention. The system includes a super-encoder 100 that is shown receiving an input video to be encoded. The super-encoder 100 performs encoding in a single high resolution format, such as HEVC. Metadata is then generated and placed with the encoded data in the super-encoder to enable transcoding of lower resolution formats, such as MPEG2 or MPEG4. The super-encoded data is then stored in the memory 102 of a network DVR 104.

The encoded data in the DVR 104 can then be provided directly to a video viewing device from the DVR memory 102 when HEVC is the desired resolution format. When other formats are desired, the encoded data along with metadata is provided from the DVR memory 104 to a JIT transcoder 106. The JIT transcoder 106 uses the metadata to perform transcoding, with the metadata reducing the computational requirements for the transcoding.

Figure 2:
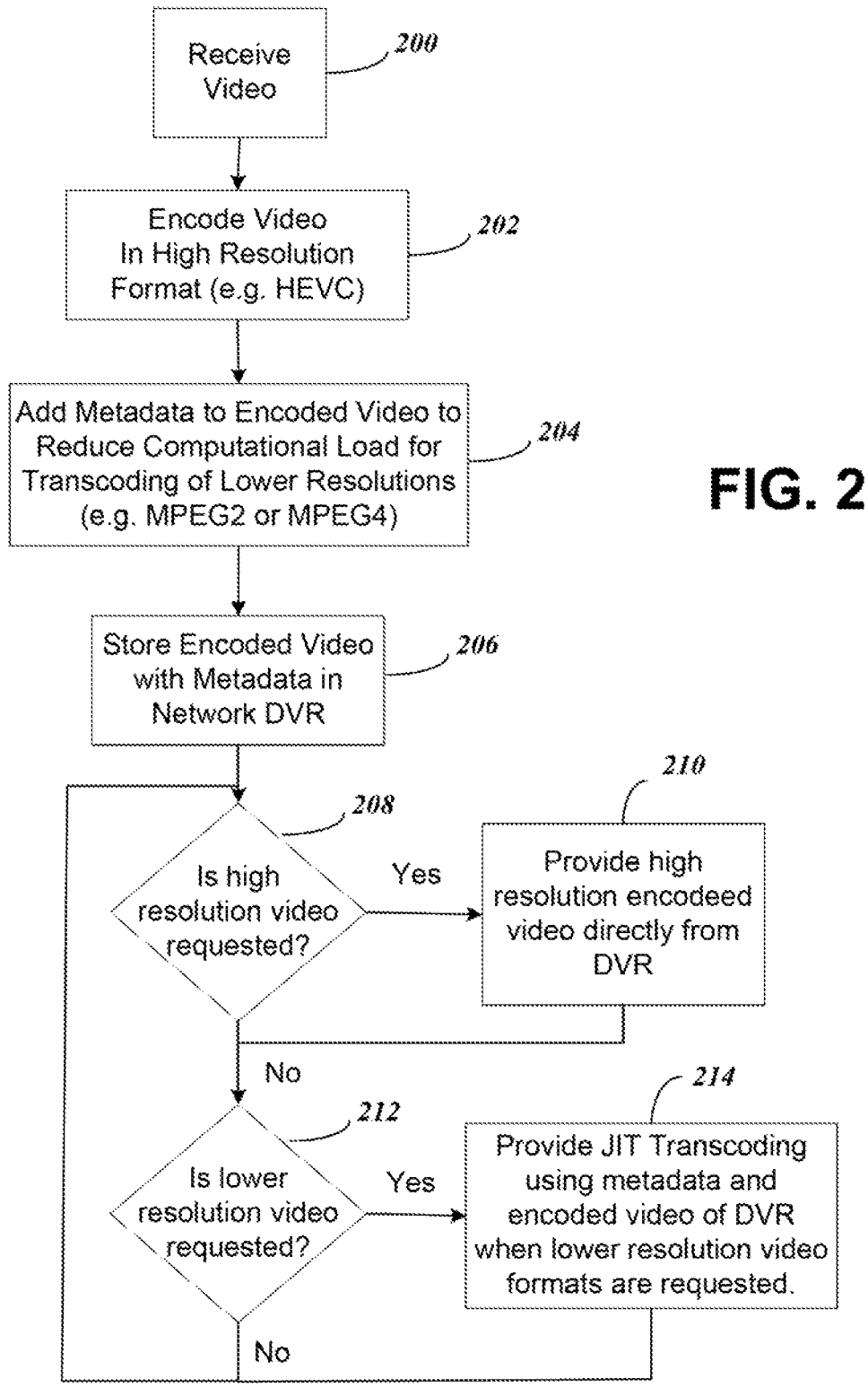
FIG. 2 is a flowchart showing steps according to the present invention for super-encoding, storage of data in a DVR, and JIT transcoding.

FIG. 2 is a flowchart showing the steps according to the present invention for super-encoding, storage of data in a DVR, and JIT transcoding using the system of FIG. 1. Initially in step 200 unencoded video is received at a super-encoder. In step 202 the video is encoded in a high resolution format, such as HEVC. In step 204 metadata is added to the encoded video to reduce the computational load during transcoding of the lower resolution video, such as MPEG2 or MPEG4. Next in step 206 the encoded data and metadata are stored in the memory of a network DVR.

The next phase of the flowchart of FIG. 2 illustrates the process when video is requested from the DVR memory. In step 208 a determination is made if the high resolution encoded video is requested from the DVR memory. If the high resolution video, such as HEVC, is requested, in step 210 the encoded video is provided directly from the DVR memory to the requesting player device from the DVR. A determination is further made in step 212 if a lower resolution video is requested. When the lower resolution video is desired, in step 214, the metadata and encoded data from the DVR memory are provided to a JIT transcoder to respond to the request and created the requested lower resolution video. The system can continue to check for requests for either high resolution or lower resolution video and provided the appropriate data in response to hundreds of thousands of requests.

Figure 3:
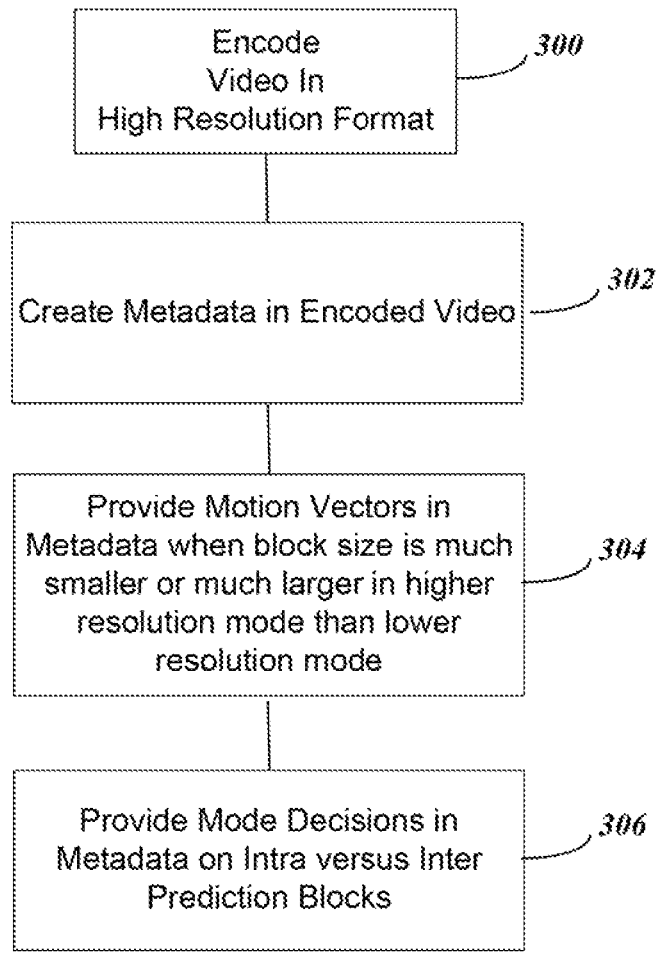
FIG. 3 is a flowchart showing steps according to the present invention for providing metadata during super-encoding.

FIG. 3 is a flowchart showing steps according to the present invention for providing metadata during super-encoding. Initially in the first step 300 the video data is received and encoded in a high resolution format and in step 302 space for metadata is created as part of the encoded video. The metadata is then generated that helps reduce the computational steps during transcoding. For instance, in step 304 the metadata created can be motion vectors. In particular, as step 304 indicates, the motion vectors can be provided when the block size is much smaller or much larger than that provided in the higher resolution mode. In another instance, in step 306, the metadata is generated to provide mode decisions on intra versus inter prediction blocks. Although steps 304 and 306 are illustrative of information that can be provided in metadata to reduce computational steps during transcoding, other information can likewise be provided in the metadata.

Although a DVR system is described as having a memory for storing the super-encoded data, other memory systems might also be used. For example, another application according to the present invention is in satellite video networks where HEVC can be compressed to minimize bandwidth over the expensive satellite link, and then transcoding provided to MPEG4 or MPEG2 in satellite receivers to be compatible with installed set top boxes. So, like the DVR application, there is a single uplink with encoding and thousands of downlink sites provided from the satellite link. Computational savings we can achieved by doing additional processing at the satellite uplink to reduce the overall cost of the network.

For each of the components shown, like the super-encoder 100, the DVR 104 and the transcoder 106 of FIG. 1, each component according to embodiments of the present invention can include a processor and memory to enable operation. The memory of each device stores code that is executable by the processor to enable the processor to perform the processes described herein. Further the memory can be used to provide data storage with the data accessible by the processor to store or retrieve when performing operations.

Although the present invention has been described above with particularity, this was merely to teach one of ordinary skill in the art how to make and use the invention. Many additional modifications will fall within the scope of the invention as that scope is defined by the following claims.

What is claimed:

1. A method for performing video encoding for storage comprising:
    providing super-encoding to compute an efficient compressed stream for storage for a single layer first resolution video; and
    computing metadata that reduces the computational load for subsequent Just In Time (JIT) transcoding the stored first resolution video as part of the super-encoding to a single layer second resolution video and storing the metadata with the compressed stream,
    wherein the metadata targets the largest computational load of transcoding.

2. The method of claim 1, wherein the metadata comprises motion vectors.

3. The method of claim 1, wherein the metadata comprises mode decisions on intra versus inter prediction blocks.

4. The method of claim 1, wherein the first resolution video is HEVC and the second resolution video is MPEG4.

5. The method of claim 4, wherein the metadata comprises motion vectors needed for MPEG4 which are not provided by HEVC when HEVC uses very large or very small block sizes relative to MPEG4.

6. The method of claim 1, wherein subsequent just in time transcoding is performed for the second resolution video for providing to a first video display with a different resolution than a second video display capable of displaying the first resolution video.

7. A system for encoding video encoding for storage, the system comprising:
    an encoding processor having an input for receiving input video data and providing an encoded video output;
    a digital video recorder (DVR) having a first memory for receiving and storing the encoded video output from the processor;
    a second memory connected to the encoding processor, the second memory storing code data to enable the encoding processor to perform the following steps:
        providing super-encoding on the input video to compute an efficient compressed stream for storage for a single layer first high resolution video; and
        computing metadata that reduces the computational load for subsequent Just In Time (JIT) transcoding the stored first high resolution video as part of the super-encoding to a single layer second resolution video and storing the metadata with the compressed stream,
    wherein the metadata targets the largest computational load of transcoding.

8. The system of claim 7, wherein the metadata comprises motion vectors.

9. The system of claim 7, wherein the metadata comprises mode decisions on intra versus inter prediction blocks.

10. The system of claim 7, wherein the first resolution video is HEVC and the second resolution video is MPEG4.

11. The method of claim 10, wherein the metadata comprises motion vectors needed for MPEG4 which are not provided by HEVC when HEVC uses very large or very small block sizes relative to MPEG4.

12. The system of claim 7, wherein subsequent just in time transcoding is performed for the second resolution video for providing to a first video display with a different resolution than a second video display capable of displaying the first resolution video.

* * * * *